United States Patent [19]

Arnquist et al.

[11] 4,087,065
[45] May 2, 1978

[54] ELECTRICAL CONTROL SYSTEM FOR ACTUATING INBOARD SPOILERS ON AIRCRAFT

[75] Inventors: Willard Dale Arnquist, Bellevue; Melvin John Roalsvig, Seattle, both of Wash.

[73] Assignee: The Boeing Company, Seattle, Wash.

[21] Appl. No.: 765,520

[22] Filed: Feb. 4, 1977

[51] Int. Cl.² .................... B64C 13/04; B64C 13/50
[52] U.S. Cl. ............................... 244/836; 244/90 R; 244/113; 244/213
[58] Field of Search ............... 244/90 R, 90 A, 836, 244/113, 110 D, 178, 196, 197, 83 K, 83 E, 83 G, 213, 203; 318/585, 590, 591

[56] References Cited

U.S. PATENT DOCUMENTS 3,618,880  11/1971  Hagaman et al. .................. 244/113

Primary Examiner—Barry L. Kelmachter
Attorney, Agent, or Firm—Conrad O. Gardner; B. A. Donahue; Daniel T. Anderson

[57] ABSTRACT

An electrical system for actuating the inboard spoilers on the wings of an aircraft in response to the lateral control input from the pilot control wheel and to the position of the pilot speed brake lever. The pilot speed brake lever position signal being used to select the modulation provided by a three mode function generator which generates the signal that actuates the spoilers.

3 Claims, 5 Drawing Figures

ELECTRICAL CONTROL SYSTEM FOR ACTUATING INBOARD SPOILERS ON AIRCRAFT

This invention relates to lateral control systems for aircraft, and more particularly to interconnection of spoilers and ailerons for minimizing pitch effects with lateral control inputs.

The use of spoilers in conjunction with ailerons with spoiler actuation in response to up deflection of an aileron and spoiler retracted with down deflection of aileron is an expedient well known in the art.

U.S. Pat. Nos. 2,494,208; 2,718,366; and 2,981,503 are representative of prior art systems for lateral control embodying means for interconnecting ailerons and spoilers.

Further, linkage utilizing cable quadrant driven rotary input (See FIGS. 4 and 5) is known in the art, e.g. U.S. Pat. No. 2,957,656 albeit therein for output to outboard ailerons.

In swept-wing aircraft outboard spoiler deflections typically cause a pitch up while the opposite holds true for inboard spoilers. This characteristic is most apparent at aft C.G.

Accordingly, it is an object of the present invention to provide means for utilizing inboard spoilers in conjunction with the ailerons in a manner negating unwanted pitching moments by symmetrically raising the inboard spoilers on both sides of an aircraft in response to differential operation of inboard ailerons on the respective wings of the aircraft.

It is yet another object of this invention to provide means for limiting the angular deflection of inboard spoilers symmetrically raised in response to differential aileron movement above or below neutral for lateral control of an aircraft when utilized as speed brakes, a first limit of deflection for in-flight mode of operation being less than a second limit of deflection set for ground mode of operation.

A further object of this invention is to provide means for summing the differential operation of the inboard ailerons with three modes of speed brake control (speed brake off; in-flight speed brake; and, ground speed brake) to achieve the desired inboard spoiler response which desired response for the in-flight speed brake mode is provided by means for "locking out" the aileron control to the inboard spoilers since spoiler angles greater than 20° would cause buffeting, and angles less than 20° would subtract from the in-flight speed brake effectiveness.

Other objects and advantages of the present invention will be readily appreciated as the same becomes better understood by reference to the following detailed description when considered with the accompanying drawings wherein.

Figures 2, 3:
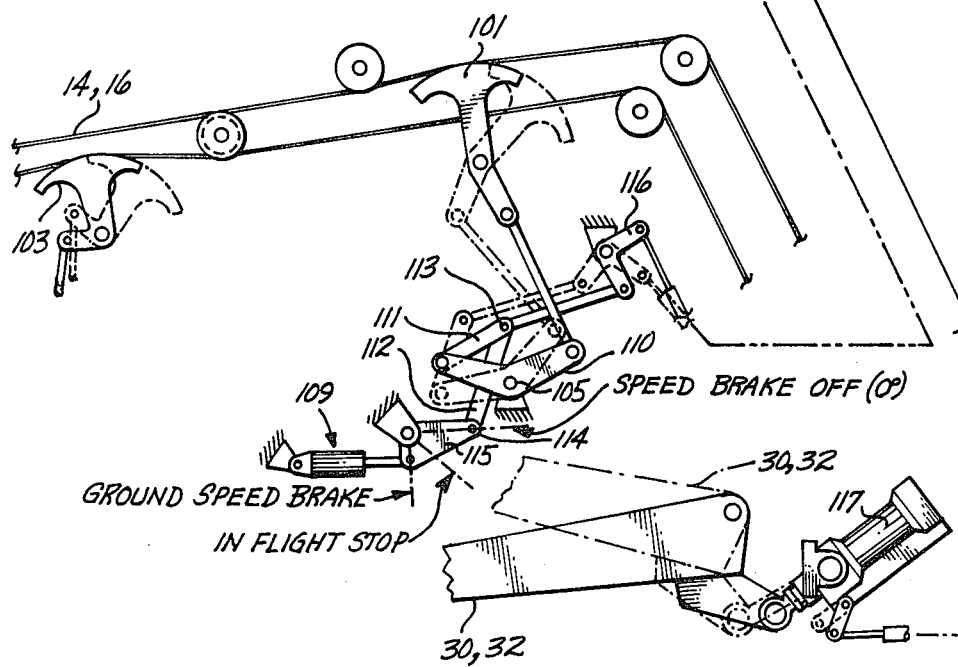
FIG. 2 is a diagrammatic showing of the respective position of components of a mechanical-hydraulic embodiment of the present lateral control system (in the speed brake off mode of operation) with inboard spoiler raised 20° above retracted position due to differential operation of the inboard ailerons.
Figure 4:
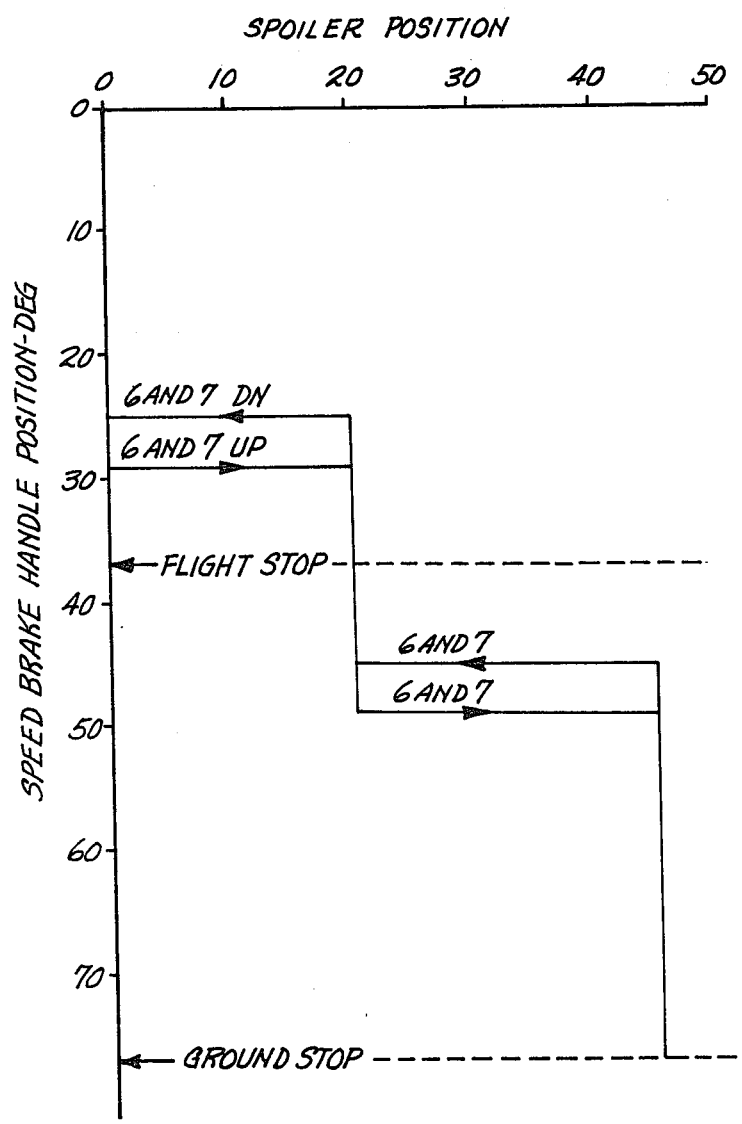
Figure 5:
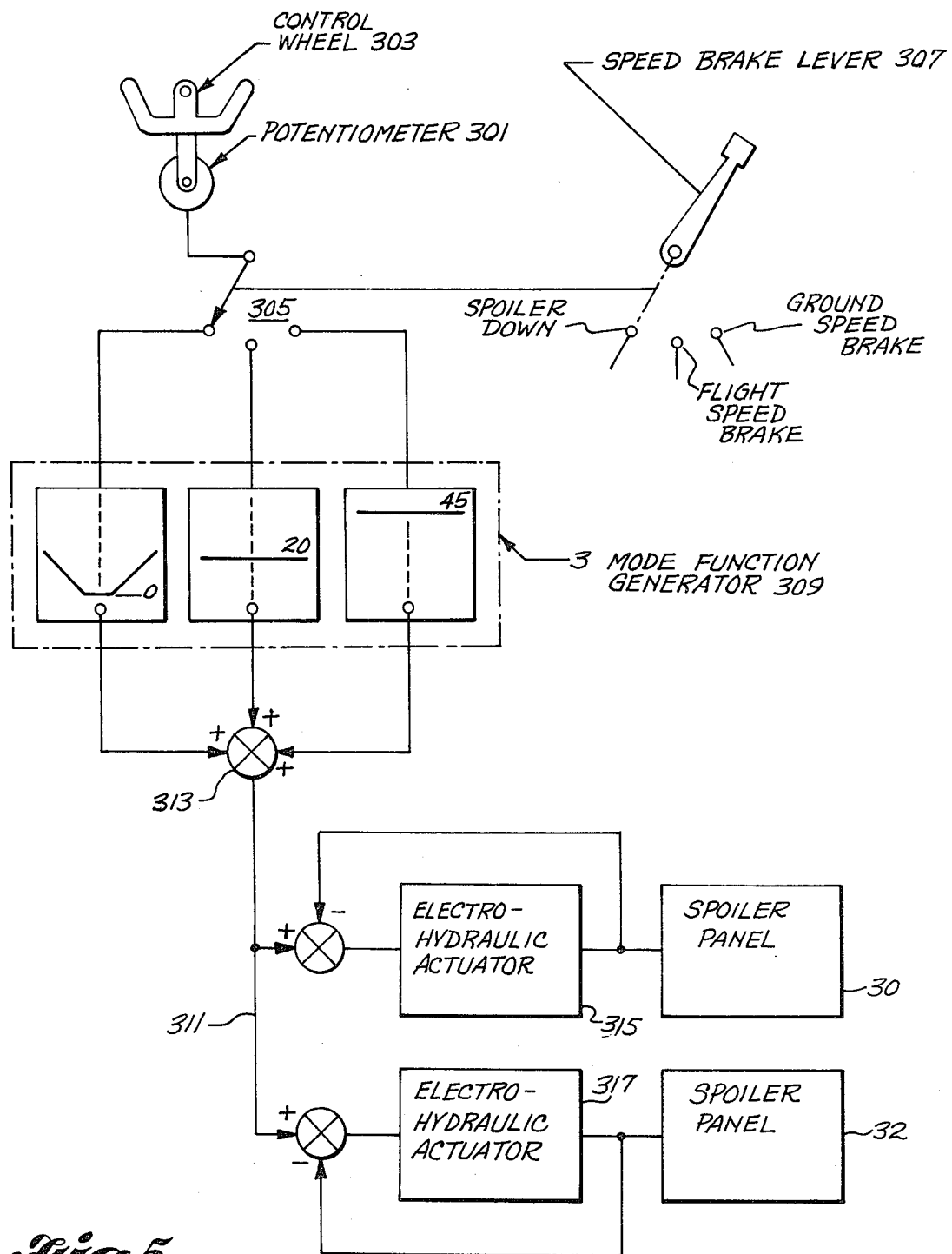

FIG. 3 is a diagrammatic showing of the respective position of components of the lateral control system embodiment of FIG. 2 with inboard spoiler raised 20° above retracted position (in the in-flight speed brake mode of operation) in which mode the inboard spoilers are locked out (i.e., will not respond to differential operation of the inboard ailerons), the ground speed brake mode not being shown, but which mode would result in 45° of inboard spoiler;

FIG. 4 is a graph illustrative of speed brake program viz. inboard spoiler position in degrees above retracted position versus speed brake handle position in degrees showing ground and in-flight limits of inboard spoiler positioning in accordance with the present control system; and FIG. 5 is a block diagram of an electrohydraulic embodiment of the present invention.

Figure 1:
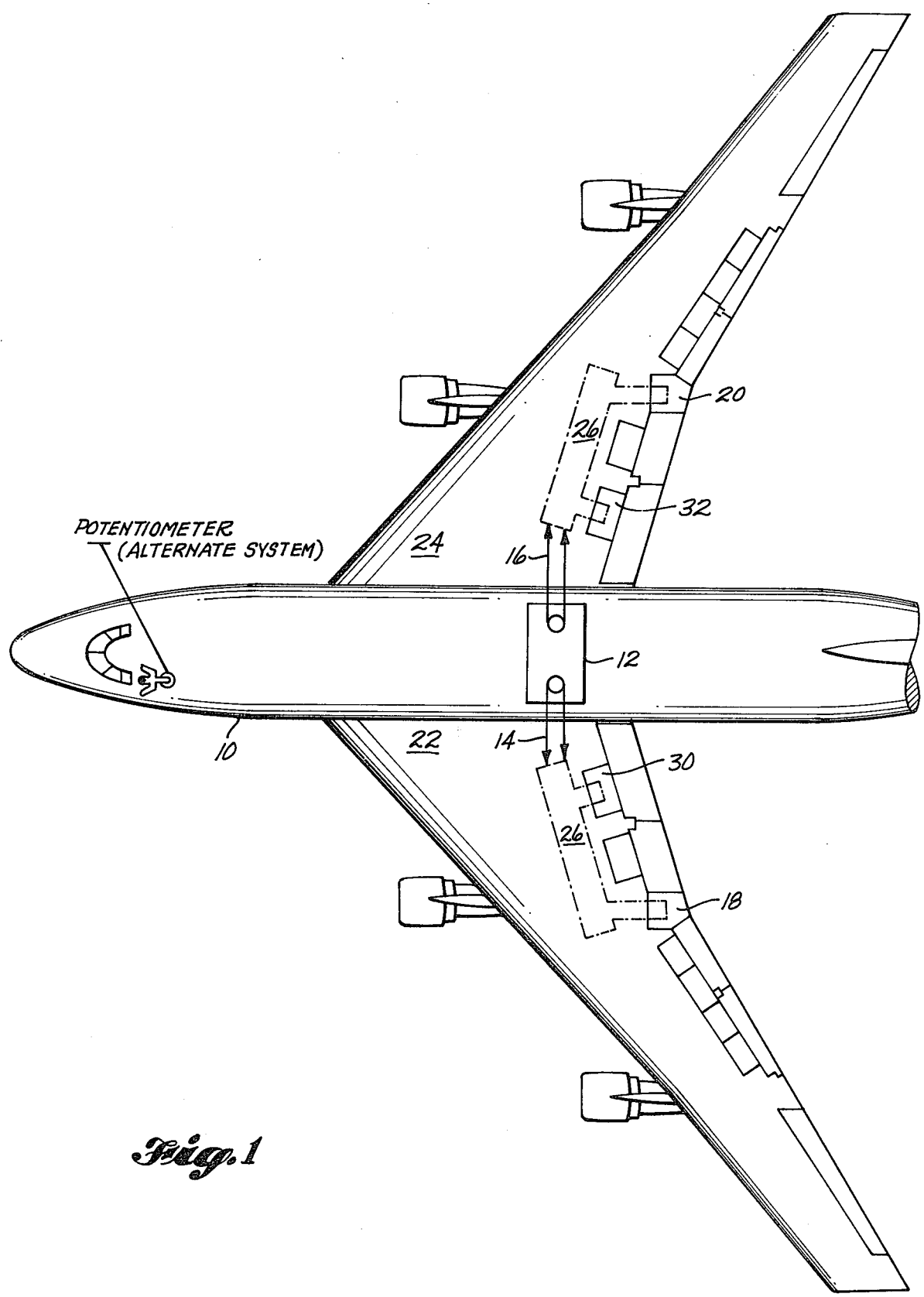
FIG. 1 is a general diagrammatic view of a portion of a high-speed swept-wing aircraft showing interconnection wherewith of the present lateral control system.

Turning now to FIG. 1, 10 indicates the fuselage of the aircraft having the usual control system 12 responsive to pilot control for providing via cables 14 and 16 operation differentially of the inboard ailerons 18 and 20 respectively on corresponding wings 22 and 24 of the aircraft in known manner for effecting lateral control. The present control system represented identically by blocks 26 on each side of the aircraft and shown in detail hereinafter (in-ground and in-flight modes of operation in FIGS. 2 and 3) can be seen as responsive to the respective differential outputs provided at cables 14 and 16, and coupled respectively between inboard aileron 18 and inboard spoiler 30, and inboard aileron 20 and inboard spoiler 32 on wings 22 and 24 on the respective sides of the aircraft. Wing 22 (as wing 24) of the present type multiengine aircraft, e.g. Boeing Company type 747SP, is provided with several further surface control devices identified by legend not numerals since not pertaining to the present lateral control system denoted by blocks 26.

Turning now to FIG. 2 and a detailed description of components of lateral control system shown in blocks 26 of FIG. 1, it must be first noted from FIG. 1 that during flight operation of the ailerons, cables 14 and 16 normally move back and forth about a central position. When an aileron on the right wing 24 rotates up the corresponding aileron on the left, wing 22 rotates down and vice-versa which is what has been hereinbefore described as differential operation of the ailerons. Conventional spoilers operate in one direction only from their retracted position and usually in-flight in prior art systems have been operated differentially to provide control similar to the ailerons, viz. flight spoilers on one side of the aircraft would raise up from the retracted position while those on the other side would remain at rest. In the present system as illustrated in FIG. 1, the means shown in FIG. 2 is provided at 26 on each side of the aircraft in order to provide a means for operating inboard spoilers 30 and 32 on both sides of the aircraft simultaneously in a modulated manner in conjunction with ailerons 18 and 20 respectively thereby minimizing the pitch effect induced into the aircraft by utilization of the lateral control system alone. In FIG. 2, a spoiler quadrant 101 has been coupled to the aileron cable control system with links in a manner hereinafter described in more detail to provide the aforementioned spoiler 30, 32 control. When aileron quadrant 103 is rotated in either direction by cables 14, 16 then spoiler quadrant 101 follows. Rotating spoiler quadrant 101 in either direction causes bell crank 110 to rotate about its pivot point 105 in one direction only from its inactive position. A plurality of links hereinafter described transfer this motion to operate inboard spoilers 30 and 32 simultaneously on both sides of the aircraft in response to and proportional to the degree of aileron deflection.

Three position actuator 109 provides a further input for inboard spoiler 30, 32 control when it is desired to use spoilers 30 and 32 as speed brakes when in flight (as shown in FIG. 3) or in speed brake off (as shown in FIG. 2), actuator means 109 position being responsive to a hydraulic valve, controlled by the pilots speed brake lever. FIG. 4 is illustrative of speed brake program and consequent spoiler position as a function of pilot's speed brake handle position with in-flight and ground stop deflection determined by actuator 109 position.

Returning now to FIG. 2, illustrative of the "speed brake off" mode (0° spoiler position) and further description of the operation thereof, it will be observed that the linkage on each side of the aircraft includes cable rocker arms operated by the aileron control cables with quadrant 103 operating the associated aileron while the motion of quadrant 101 is transmitted through bell cranks and links to the hydraulic spoiler actuators (including actuator 117) on the respective sides of the aircraft. Bell crank 110 rotation about point 105 carries point 113 of link 111 as constrained by link 112 rotating about point 114 of bell crank 115. Point 113 travel is transmitted through bell crank 116 to spoiler hydraulic actuator 117 thereby raising the spoiler approximately 20° for full aileron cable travel in either direction.

In FIG. 3 illustrative of the in-flight speed brake mode (with 20° positioning of spoiler) it will be observed that three position speed brake actuator 109 rotates bell crank 115 clockwise, pulling common point 113 of links 111 and 112 and rod on center with point 105 thereby causing spoiler actuator 117 to raise the spoiler surface to 20°. With point 113 concentrically disposed with respect to point 105, the system is "locked out" (non-responsive) from any input from the aileron cable system of the aircraft.

With respect to ground speed mode of operation (45° spoiler) it will be appreciated that three position actuator 109 retracts full travel, rotating bell crank 115 clockwise thereby causing point 113 to move clockwise through point 105 will result in the spoiler actuator raising of the spoiler surface to 45°.

The aforementioned description relating to a mechanical control system for actuating spoilers on both wings of the aircraft simultaneously will be helpful in understanding the following description accompanying the electrical system shown in FIG. 5 providing the same functions but including further features. The electrical control system of FIG. 5 utilizes electrical transducers, viz. a potentiometer 301 responsive to lateral control inputs provided by the pilot's control wheel 303 (provided through quadrant 101 in the mechanical system of FIG. 2 and 3), and speed brake inputs provided by a three position switch 305 driven by the pilot's speed brake lever 307 position (provided by three position actuator 109 responsive to the pilot's speed brake lever positions in the mechanical system of FIGS. 2 and 3). These electrical inputs are processed in the electrical system of FIG. 5 in 3 mode function generator 309 to provide an output control signal 311 downstream of combining means 313 (an adder circuit) for actuating inboard flight spoilers 30 and 32 simultaneously in the same modulated manner hereinbefore discussed in connection with the system of FIGS. 2 and 3, however, in the embodiment of FIG. 5 such modulation being determined by the shaping in generator 309 selected by the mode selecting switch 305 in response to speed brake lever 307 positioning. Electrohydraulic actuators 315 and 317 are utilized on the respective sides of the aircraft which are responsive to control signal 311 instead of mechanically driven hydraulic actuators such as actuator 117 in the mechanical control system of FIGS. 2 and 3.

What is claimed is:

1. An electrical control system for actuating inboard spoilers on the wings of an aircraft comprising:
   first means responsive to lateral control information provided by pilot control wheel of the aircraft for providing a first signal;
   second means responsive to pilot speed brake lever positioning for providing a second signal;
   third means including a three mode function generator responsive to said first and second signals for providing an output control signal for actuating said inboard spoilers simultaneously in a modulated manner.

2. The invention according to claim 1 wherein the modulation provided by said three mode function generator is selected through mode switching of said three mode function generator by said second signal.

3. An aircraft control system for inboard spoilers comprising in combination:
   first means responsive to lateral control information for providing a first signal;
   a three mode function generator for providing first, second, or third output signals in response to said first signal;
   switching means responsive to aircraft speed brake lever positioning for selecting one of the three modes of the three mode function generator for providing said first, second, or third output signals; and,
   means coupled between said three mode function generator and said inboard spoilers for simultaneously controlling said inboard spoilers in a modulated manner as a function of said first, second, or third output signals.

* * * * *